Patented June 13, 1944

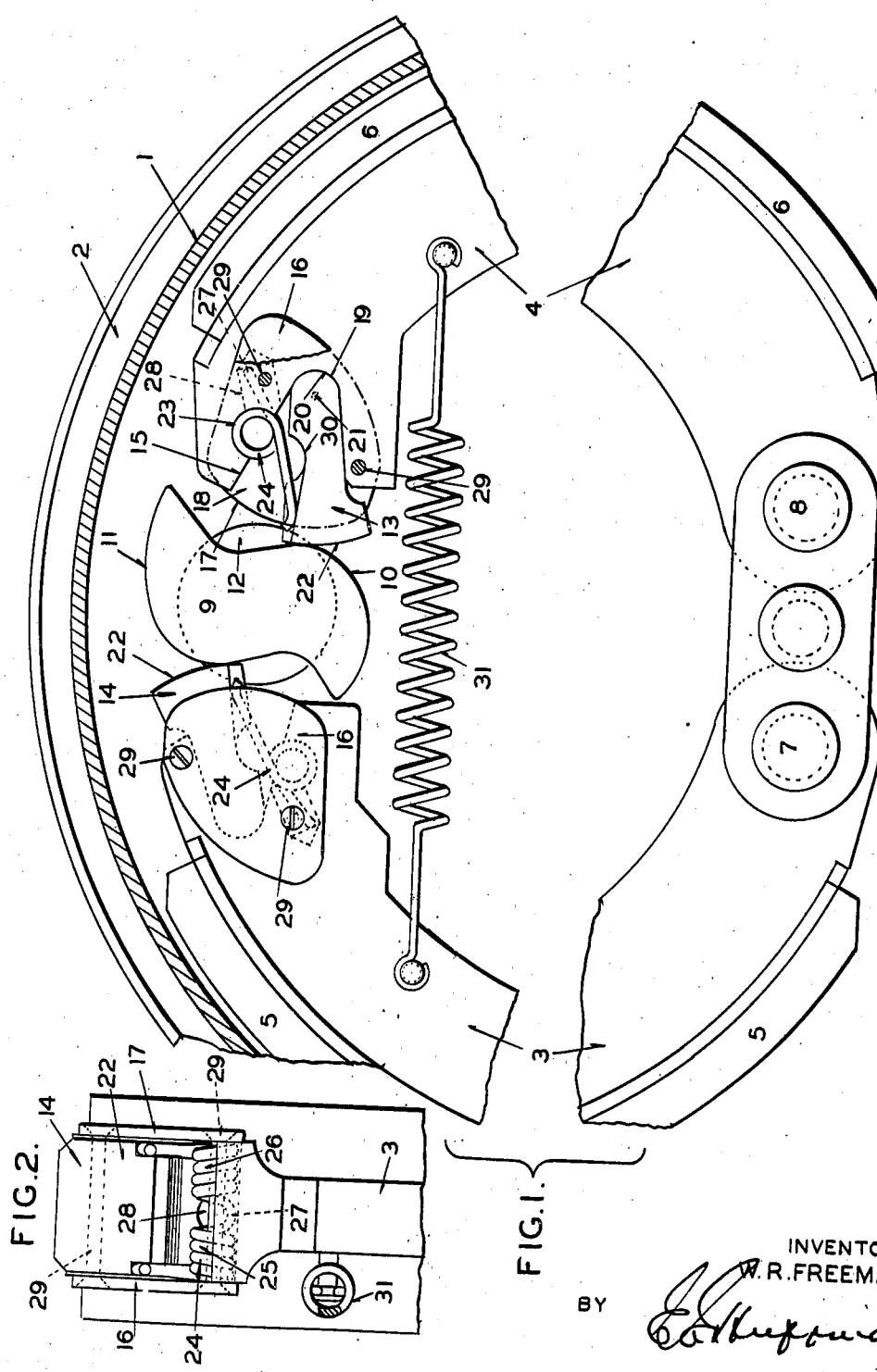

2,351,114

UNITED STATES PATENT OFFICE 2,351,114

CAM-ACTUATED BRAKE

Walter R. Freeman, Clayton, Mo., assignor to Wagner Electric Corporation, St. Louis, Mo., a corporation of Delaware Application March 31, 1943, Serial No. 481,220

11 Claims. (Cl. 188—78)

My invention relates to brakes and more particularly to an improvement in brakes which are actuated by a rotatable cam.

One of the objects of my invention is to provide an improved cam actuating means for applying a brake shoe to a drum which will have a minimum of friction losses when brake applying force is transmitted to the brake shoe to apply said shoe.

Another object of my invention is to provide in a cam-actuated brake, means for permitting the cam surface to have rolling contact with the member engaged thereby but only after the brake friction element has been caused to engage the drum.

Other objects of my invention will become apparent from the following description taken in connection with the accompanying drawing in which Figure 1 is a view of a cam-actuated brake embodying my invention, parts being shown in section; and Figure 2 is an end view of one of the brake shoes showing details of the mounting of the sector member.

Referring to the drawing in detail, numeral 1 indicates a brake drum adapted to be fixed to the wheel of a vehicle and 2 a backing plate or support enclosing the open side of the drum and adapted to be secured to some fixed part of the vehicle as, for example, the axle housing. Positioned within the drum for cooperation therewith are two brake shoes 3 and 4 having linings 5 and 6, respectively. The brake shoes are pivotally mounted on the backing plate at their lower ends by anchor pins 7 and 8. The upper ends of the brake shoes are adapted to be actuated into engagement with the drum by means of an S-type cam 9 having cam surfaces 10 and 11, said cam being secured to the inner end of an actuating shaft 12 rotatably mounted in the backing plate.

In accordance with my invention, I provide the actuated ends of the brakes with special sector members 13 and 14 for cooperation with cam surfaces 10 and 11, respectively. The end of shoe 4 with which the sector member 13 is associated has a V-shaped recess 15 therein closed at its sides by plates 16 and 17 to provide a socket 18. The inner end of recess 15 is formed with a semi-cylindrical surface 19. The sector member 13 is positioned in the socket, said member also being of general V-shaped construction with the angle between its side surfaces being smaller than the angle between the side surfaces of recess 15 to thus permit a limited degree of pivotal movement of the sector member in the socket. The inner end of the sector member has a semi-cylindrical surface 20 of the same radius as surface 19 so that the two can cooperate with each other to permit free pivoting of the sector member about an axis 21 which coincides with the axes of the two semi-cylindrical surfaces. The outer end of the sector member is formed with an arcuate surface 22 having an axis coinciding with axis 21. This arcuate surface 22 is adapted to cooperate with cam surface 10 on the rotatable cam.

The top wall of recess 15 has a semi-cylindrical notch 23 in which is positioned a spring member 24. This spring member comprises two coils 25 and 26 with a connecting central portion 27 which extends into a bore 28 in the shoe for engagement with one of the pins 29 employed for holding the socket forming plates 16 and 17 in position. The outer ends of each of the coils extend tangently and engage the sector member 13. Thus it is seen from this construction that the spring member 24 exerts a biasing force on sector member 13 to hold it against the lower wall of recess 15. The spring member is of such construction as to exert a predetermined force on the sector member to prevent it from rotating in the socket under certain conditions. The sector member has a recess 30 to receive part of the coils of the spring member which extends into recess 15, thus permitting the sector member to have full turning movement from the lower wall to the upper wall of the socket.

The sector member 14 is mounted in brake shoe 3 in a manner similar to that described in connection with sector member 13. The socket construction, spring, and other features are indicated by the same reference characters. However, it is to be noted that the sector member 14, which cooperates with cam surface 11, is mounted so as to be biased by its spring to the upper side of its recess 15 which is just opposite that of sector member 13. Thus with this arrangement when cam 9 is rotated in a counterclockwise direction, both sector members can be rotated in their sockets.

The brake shoes are held in their "off" positions by a retracting spring 31 having its ends connected to the two shoes. This spring maintains the sector members 13 and 14 in contact with the cam. The spring members 24 acting on the sector members are of such strength that the sector members will be yieldably held from rotation in their sockets until the retracting spring is stretched and the brake shoes have been caused to engage the drum with some pressure.

Thus during the movement of the shoes into engagement with the drum, cam surface 10 will slide over the arcuate surface 22 of sector member 13 and cam surface 11 will slide over the arcuate surface 27 of sector member 14. The operation of the brake shoes during their application of the drum will be the same as in prior constructions which employ no sector members and the cam surfaces directly engage rigid parts of the shoe ends. When the pressure with which the shoes are engaged with the drum reaches such a value that the sliding friction between the cam surfaces and the engaged arcuate surfaces of the sectors will cause the sector members to rotate and overcome the action of the spring means, the cam surfaces and the engaged arcuate surfaces of the sector members will roll on each other. This rolling engagement will cause considerably less friction loss and, therefore, most of the force being put into the cam will be transmitted to the shoes to apply them with additional pressure on the drum.

It is to be noted that the sliding between the cam surfaces and the sector members takes place when small forces are being transmitted to apply the brake shoes. It is only after the brake shoes have engaged the drum and are being applied with increasing pressure that the sliding engagement is eliminated and a rolling engagement substituted therefor. The disadvantages of the ordinary cam-actuated brake are thus eliminated, namely, a large friction loss between the input force and the brake shoe applying force during heavy brake application. The angle of rotation of the sector members during brake application can be decreased by permitting the cam surface to slide on the sector members during initial application of the brake shoes. This permits the radius of the sector member arcuate surfaces to be increased for a given available space. The results obtained will be substantially the same as those which could be obtained by the use of very large annular rollers pivoted on the shoe ends, a construction not possible due to space requirements. It is also apparent in connection with the sector members and the spring means associated therewith that in the event of breakage of the springs, the brakes can still be actuated although the advantage obtained from the rolling contact may not be present during heavy brake application if the linings are so worn that all the rolling contact occurs during the initial application of the brakes.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a brake, a drum, a brake shoe having an end to be actuated into engagement with the drum, a member pivoted on the end of the shoe and having a curved surface, a rotatable actuating member having a cam surface for engaging the curved surface of the pivoted member, means for limiting the extent of pivotal movement of the pivoted member, and means for causing the cam surface to have sliding engagement with the curved surface when the rotatable member is initially rotated to bring the shoe into engagement with the drum but permitting a subsequent rolling engagement between the cam surface and the curved surface during continued rotation of the rotatable member.

2. In a brake, a drum, a brake shoe having an end to be actuated into engagement with the drum, a roller sector pivotally mounted on the end of the shoe, a rotatable actuating member having a cam surface for engaging the non-pivoted end of the roller sector, and yieldable means for preventing the roller sector from pivoting on the shoe and having rolling contact with the cam surface until the shoe has been moved into engagement with the drum.

3. In a brake, a drum, a brake shoe having an end to be actuated into engagement with the drum, a member pivoted on the end of the shoe and having an arcuate surface, a rotatable actuating member having a cam surface for engaging the arcuate surface of the pivoted member, and spring means for preventing the pivoted member from having rolling contact with the cam surface as the actuating member is rotated until the brake shoe has predetermined pressure engagement with the drum.

4. In a brake, a drum, a brake shoe having an end to be actuated into engagement with the drum, a member pivotally mounted on the end of the shoe and having an arcuate surface, stop means for limiting the pivotal movement of said member in one direction, a rotatable actuating member having a cam surface for engaging the arcuate surface of the pivoted member, and spring means for normally biasing the pivoted member against its stop when the rotatable actuating member is in a position permitting the shoe to be free from the drum.

5. In a brake, a drum, a brake shoe having an end to be actuated into engagement with the drum, a member pivoted on the end of the shoe and having an arcuate surface, a rotatable actuating member having a cam surface for engaging the arcuate surface of the pivoted member, and spring means for preventing the pivoted member from having rolling contact with the cam surface as the actuating member is rotated until the brake shoe has predetermined pressure engagement with the drum, said spring means comprising a coil spring mounted with its axis parallel with the pivotal axis of the pivoted member and having one end fixed to the shoe and the other end engaging the pivoted member.

6. In a brake, a drum, a brake shoe having an end to be actuated into engagement with the drum, means forming a socket in said shoe and provided with a curved inner end surface, a sector member positioned in said socket and of such size as to be capable of limited pivotal movement therein, said sector member having its inner end provided with a curved surface for cooperation with the inner end curved surface of the socket to thus provide a pivot for the sector member and its outer end provided with an arcuate surface having its axis coinciding with the pivotal axis of the sector, and a rotatable actuating member having a cam surface for cooperative rolling engagement with the outer arcuate end surface of the sector member.

7. In a brake, a drum, a brake shoe having an end to be actuated into engagement with the drum, means forming a socket in said shoe and provided with a curved inner end surface, a sector member positioned in said socket and of such size as to be capable of limited pivotal movement therein, said sector member having its inner end provided with a curved surface for cooperation with the inner end curved surface of the socket to thus provide a pivot for the sector member and its outer end provided with an arcuate surface having its axis coinciding with the pivotal axis of the sector, a rotatable actuating member having a cam surface for cooperative rolling engagement with the outer arcuate end surface of the sector member, and spring means for biasing the sector member to one side of the socket.

8. In a brake, a drum, a brake shoe having an end to be actuated into engagement with the drum, means forming a socket in said shoe and provided with a curved inner end surface, a sector member positioned in said socket and of such size as to be capable of limited pivotal movement therein, said sector member having its inner end provided with a curved surface for cooperation with the inner end curved surface of the socket to thus provide a pivot for the sector member and its outer end provided with an arcuate surface having its axis coinciding with the pivotal axis of the sector, a rotatable actuating member having a cam surface for cooperative rolling engagement with the outer arcuate end surface of the sector member, and spring means for biasing the sector member to one side of the socket, said spring means being of the coil type positioned with its axis at right angles to the plane of movement of the sector member and having one end fixed to the shoe and its other end engaging the sector member.

9. In a brake, a drum, a brake shoe having an end to be actuated into engagement with the drum, means forming a socket in said shoe end provided with an arcuate inner end surface and outwardly diverging wall surfaces, a sector member positioned in said socket and of such size as to be capable of limited pivotal movement therein, said sector member having its smaller inner end provided with an arcuate surface of the same radius of curvature as the inner end surface of the socket for cooperation therewith and its outer end provided with an arcuate surface the axis of which is the same as that of the arcuate inner end surface, and a rotatable actuating member having a cam surface for cooperative rolling engagement with the outer arcuate end surface of the sector member.

10. In a brake, a drum, a brake shoe having an end to be actuated into engagement with the drum, means forming a socket in said shoe end provided with an arcuate inner end surface and outwardly diverging wall surfaces, a sector member positioned in said socket and of such size as to be capable of limited pivotal movement therein, said sector member having its smaller inner end provided with an arcuate surface of the same radius of curvature as the inner end surface of the socket for cooperation therewith and its outer end provided with an arcuate surface the axis of which is the same as that of the arcuate inner end surface, a spring for normally biasing the sector member to one side of the socket with a predetermined pressure, and a rotatable actuating member having a cam surface for engagement with the outer arcuate end surface of the sector member, said rotatable member when actuated causing the cam surface and the outer arcuate surface of the sector member to have rolling engagement when the friction therebetween is sufficient to cause the sector member to rotate against the spring force.

11. In a brake, a drum, two brake shoes having adjacent ends to be actuated into engagement with the drum, a member pivotally mounted on the actuated end of each shoe and having an arcuate surface, a rotatable actuating S-type cam mounted between the shoe ends with one cam surface engaging the arcuate surface of one of the pivoted members and the other cam surface engaging the arcuate surface of the other pivoted member so that when the cam is rotated the pivotal members will be caused to rotate in a like direction, a stop associated with each pivoted member for preventing said member from rotation in a direction opposite to that caused by the rotation of the cam, and a spring associated with each pivoted member and biasing said member against its stop when the rotatable member is in a position permitting the shoes to be free from the drum.

WALTER R. FREEMAN.